United States Patent [19]

Petersen et al.

[11] Patent Number: 4,949,010
[45] Date of Patent: Aug. 14, 1990

[54] X-RAY ATTENUATING CERAMIC MATERIALS

[75] Inventors: Ronald O. Petersen, Banks, Oreg.; James L. McAlpin, Somers Point, N.J.

[73] Assignee: Tektronix, Inc., Beaverton, Oreg.

[21] Appl. No.: 142,176

[22] Filed: Jan. 11, 1988

Related U.S. Application Data

[63] Continuation-in-part of Ser. No. 642,019, Aug. 20, 1984, Pat. No. 4,804,885, which is a continuation of Ser. No. 345,851, Feb. 4, 1982, abandoned.

[51] Int. Cl.$^5$ .................. H01J 31/00; H04N 5/65; G21K 1/00
[52] U.S. Cl. .................. 313/480; 250/515.1; 250/518.1; 252/478; 252/629; 313/477 R; 313/479; 358/247; 378/161; 445/22; 501/62; 501/63; 501/64; 501/72; 501/69; 501/74; 501/152; 501/153; 501/154
[58] Field of Search ............... 313/477 R, 480, 479; 313/468; 378/51, 70, 156, 161, 158; 252/478, 629; 250/506.1, 515.1, 518.1; 358/247; 501/50, 51, 64, 78, 126, 152; 445/22

[56] References Cited

U.S. PATENT DOCUMENTS

| | | | |
|---|---|---|---|
| 2,912,340 | 11/1959 | Pincus | 65/59.22 |
| 2,962,136 | 11/1960 | Pincus | 252/478 |
| 3,207,936 | 9/1965 | Wilbanks et al. | 252/478 |
| 3,356,579 | 12/1967 | Harrington | 252/478 |
| 3,464,932 | 9/1969 | Connelly et al. | 252/478 |
| 3,640,887 | 2/1972 | Anderson | 501/152 |
| 3,663,246 | 5/1972 | La Grouw | 252/478 |
| 3,808,154 | 4/1974 | Omori | 252/478 |
| 3,907,584 | 9/1975 | Wada et al. | 106/53 |
| 3,987,330 | 10/1976 | Shell | 313/480 |
| 4,065,697 | 12/1977 | Steierman | 313/480 |
| 4,130,775 | 12/1978 | Perkins et al. | 313/397 |
| 4,142,128 | 2/1979 | Odenthal | 315/15 |
| 4,277,286 | 7/1981 | Boyd et al. | 106/52 |
| 4,330,633 | 5/1982 | Yoshisato et al. | 501/152 |
| 4,342,943 | 8/1982 | Weaver | 313/479 |
| 4,350,532 | 9/1982 | Randklev | 106/30 |
| 4,358,549 | 11/1982 | Randklev | 523/117 |
| 4,366,252 | 12/1982 | Weaver | 252/478 |
| 4,376,829 | 3/1983 | Daiku | 313/480 |
| 4,390,637 | 6/1983 | Daiku | 252/478 |
| 4,520,115 | 5/1985 | Speit et al. | 252/478 |
| 4,599,319 | 7/1986 | Sack | 252/478 |
| 4,690,911 | 9/1987 | Nakada | 501/152 |
| 4,692,419 | 9/1987 | Matsui et al. | 501/152 |
| 4,692,420 | 9/1987 | Oda et al. | 501/152 |
| 4,734,388 | 3/1988 | Cameron et al. | 501/152 |

Primary Examiner—Howard J. Locker
Attorney, Agent, or Firm—Richard J. Polley

[57] ABSTRACT

X-ray attenuating polycrystalline ceramic materials having at least 20 wt. percent cerium oxide are disclosed. In addition, the materials can include one or more X-ray attenuating substances selected from the group including compounds of strontium, zirconium, yttrium, niobium, molybdenum, neodymium and tungsten. The materials can be formed in strong, non-porous bodies such as cathode ray tube funnels.

11 Claims, 1 Drawing Sheet

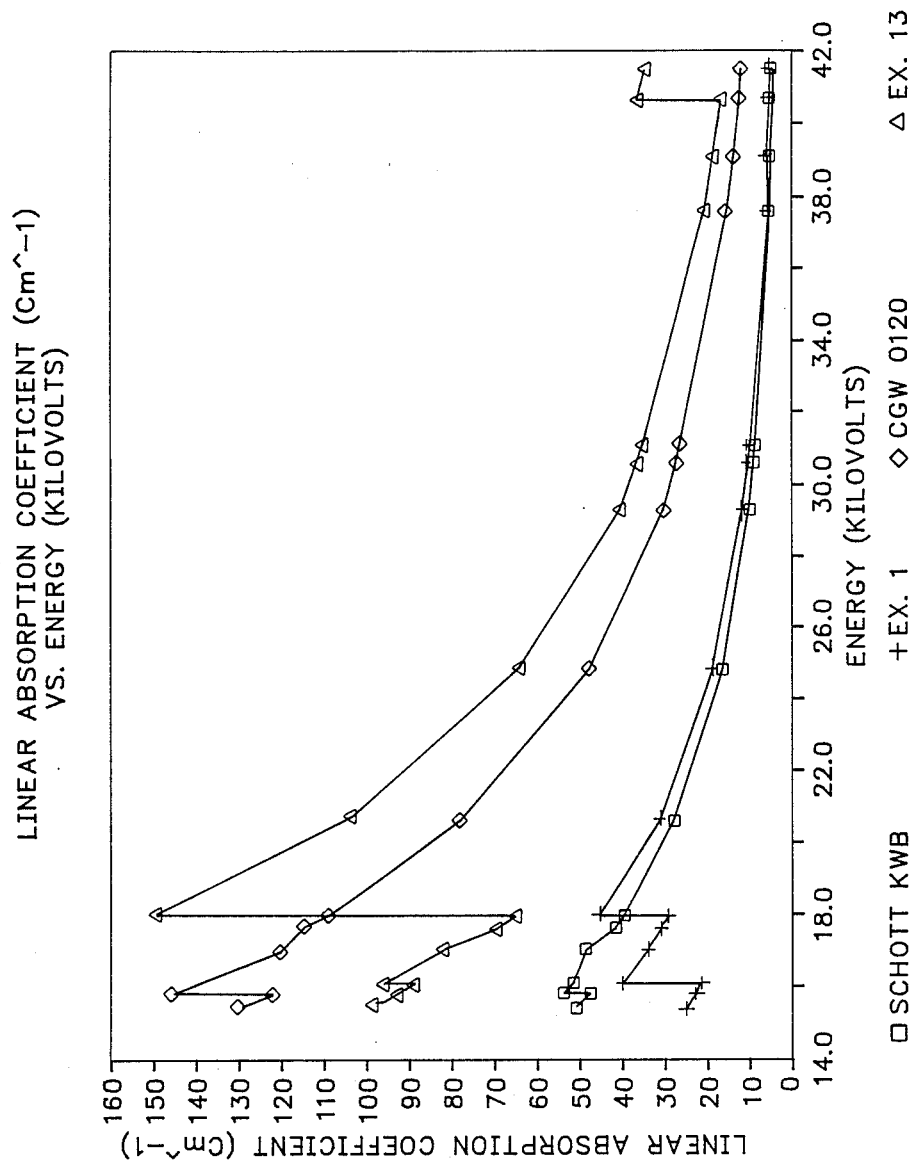

X-RAY ATTENUATING CERAMIC MATERIALS

This is a continuation-in-part of U.S. Application Ser. No. 642,019, filed Aug. 20, 1984, now U.S. Pat. No. 4,804,885, which is a continuation of Ser. No. 345,851, filed Feb. 4, 1982, now abandoned.

SUMMARY OF THE INVENTION

The present invention relates to the use of ceramic materials in the manufacture of electronic components, such as funnel structures for electron beam display devices. More specifically, it relates to the formation of polycrystalline ceramic materials capable of absorbing X-radiation.

When high speed electrons strike a body, such as a wall of a cathode ray tube envelope, X-rays are emitted. Thus, it is a standard practice to shield high voltage cathode ray tubes for the protection of persons in the vicinity of devices such as color televisions and certain oscilloscopes. If shielding were not used, such persons might be exposed to injurious amounts of X-radiation.

The most commonly used shields employ a sheet of an X-ray attenuating metal material, such as nickel alloy (MuMetal) or lead, mounted to surround the cathode ray tube. But, such a shielding materials is costly and increases the complexity of CRT devices and their manufacture. Furthermore, it is difficult to manufacture metal shields having seams that entirely prevent the leakage of radiation.

To eliminate the need for metal shielding, cathode ray tube envelopes can be made of special glass formulations which inhibit X-ray penetration. U.S. Pat. Nos. 3,464,932; 3,663,246; 3,794,502; 4,065,696; 4,065,697 and 4,174,490 disclose particular glass compositions which are absorptive of X-radiation. Likewise, United Kingdom patent Nos. 1,250,425 and 1,397,312 and published patent application No. 2,057,422A describe X-ray attenuating glass compositions. X-ray attenuating glasses are discussed generally in Larua L. Sun and Kuan-Han Sun, "X-Ray Absorbing and Transmitting Glasses", *The Glass Industry*, December 1948, beginning at page 686.

As described in the above-listed references, each X-ray attenuating glass composition includes a particular substance which is absorptive of X-radiation. Most of the above patents describe cathode ray tube faceplates made of glass compositions that contain PbO for X-ray attenuation. Cathode ray tube funnels have also been made from X-ray attenuating glass containing PbO.

Other glass compositions used to form cathode ray tube components have included SrO, $Y_2O_3$ or $ZrO_2$ for the purpose of X-ray attentuation. But, glass compositions that employ X-ray attenuating substances other than PbO usually have high melting temperatures. It is impractical to use a high melting temperature glass when building cathode ray tube components. Furthermore, if a glass-making batch contains a sufficient amount of SrO or $ZrO_2$ to achieve good X-ray attenuation, the resulting glass will tend to be devitrified and have poor forming properties.

Even the X-ray attenuating glass compositions which have good properties are of somewhat limited utility. This is because it is inherently disadvantageous to manufacture any electronic component from a body of glass, unless great quantities of the component are to be manufactured. Complex tooling is necessary to form glass bodies such as funnels for cathode ray tubes. These requirements make it impossible to economically produce glass components, except on a very large scale. If a particular cathode ray tube funnel is desired in limited quantities, the cost of tooling and manufacturing a glass body would be prohibitive. Also, it is difficult or impossible to mold glass bodies having complex shapes or even small radius corners.

A suitable funnel can, however, be manufactured from a polycrystalline ceramic material using simpler and less expensive tooling. The funnel can have small radius corners. And, because equivalent ceramic materials can have lower firing temperatures than those required for glass compositions, smaller furnaces can be used and less energy consumed for firing.

A polycrystalline ceramic cathode ray tube funnel may be used with a glass faceplate if both components have a similar thermal coefficient of expansion. Such a composite cathode ray tube and method for its construction are shown in U.S. Pat. Nos. 3,207,936, H. Wilbanks, et al. The cathode ray tube shown in the Wilbanks patent employs a glass faceplate and neck piece that are frit-sealed to a ceramic funnel. It is relatively easy to manufacture such a composite tube. And, low volume production runs of special purpose cathode ray tubes are feasible when a ceramic funnel is used in such a composite structure.

Some polycrystalline ceramic cathode ray tube funnels are presently manufactured from forsteritic porcelain materials of the type described in the Wilbanks patent at column 5, lines 18–26. Although such funnels have good mechanical characteristics, they are virtually transparent to X-radiation. It has thus been necessary to use external shielding of lead and/or nickel alloy (MuMetal) when a high voltage cathode ray tube has such a ceramic funnel.

Small amounts of BaO have been included in forsteritic porcelain materials as described in U.S. Pat. Nos. 2,912,340 and 2,962,136, both of A. G. Piknkus. However, there has been no recognition that the Pinkus ceramic absorbs X-radiation. And, such materials have not been used to form electrical components, such as cathode ray tube funnels, for which X-ray attenuation would be a useful property.

Recently, Tektronix, Inc. of Beaverton, Oreg. has manufactured cathode ray tube funnels of forsteritic porcelains that include substantial amounts of X-ray attenuating elements such as zinc, strontium, and zirconium. Although such funnels are quite useful, they do not attenuate X-radiation at voltages greater than 24 kV.

A major reason why the best glasses have out performed the best polycrystalline ceramics is difficulty of devising a usable polycrystalline ceramic formulation which sinters at a relatively low temperature. Any significiant addition to a known ceramic-making batch will cause a change in the physical properties of the resulting ceramic body. In some instances, particularly if PbO were included for X-ray attenuation, the resulting changes would be quite detrimental. And, manufacturing problems would be expected to occur.

For example, one would expect a change in thermal expansion coefficients if ceramic bodies were produced from a known batch to which an X-ray attenuating substance was added. If the bodies are cathode ray tube funnels, a sufficient shift in the coefficient would cause the funnels to be incompatible with standard CRT faceplate glass.

Another difficulty is that additions of X-ray attenuating substances can alter the fusion properties of a polycrystalline ceramic material, by moving its firing temperature to an unacceptable level. At an elevated firing temperature, there is a high energy requirement for manufacturing. If the X-ray attenuating substances act as fluxing agents, it is difficult to form a polycrystalline ceramic body of a desired shape. Specifically, a polycrystalline ceramic body is formed by pressing a particulate batch into a mold of a desired shape and firing the molded object in a kiln. During firing, the object must not shrink or soften extensively if the body is to retain its shape. Softening would be expected if ceramic material contained an X-ray attenuating substance, such as PbO, that is a glass-fomer. If present, such a substance would tend to volatize and to flux and melt a ceramic composition. As a result, slumpinq shrinkage would occur during firing.

Furthermore, if volatilizable substances such as PbO are used, gases released during firing pose a health hazard to workers and contaminate the refractories of the firing kiln.

It is now discovered that it is possible to formulate polycrystalline ceramic materials that are as good or better than glass compositions at attenuating X-radiation generated over a wide range of voltages. Bodies of such ceramic materials have good mechanical and electrical properties after firing and can be formed without undue difficulty.

Such a polycrystalline ceramic material has, as an essential ingredient, at least 20 wt. percent $CeO_2$. The material should include a total of at least 45 wt. percent of X-ray attenuating oxides, including the cerium. The best results are achieved when the cerium is accompanied by at least 20 percent, by weight on the oxide basis, of an X-ray attenuating element such as barium, strontium, yttrium, zirconium or niobium or a mixture of such compounds. Preferably, the ceramic includes no lead, but not more than five wt. percent PbO in any event. Bodies made of such a material can have desirable physical characteristics and high electrical resistivity. Such a material can be used to manufacture a cathode ray tube funnel having thin, relatively lightweight walls that absorb X-radiation to the extent that the CRT can be safely operated at 30 kV without metal shielding. In many instances, there is no detectable X-radiation penetration of CRT funnels made of such materials.

Other X-ray attenuating ingredients which can be included to form ceramic materials according to the present invention include compounds of molybdenum, neodymium, and tungsten. Although less preferred, these substances can be included with cerium in a ceramic material for X-ray attenuation, either alone or in combination with the other substances listed above.

ZnO is somewhat useful if combined with cerium in a ceramic material. For substantial X-ray attenuation, an additional X-ray attenuating substance should be used with the cerium and zinc. And, the amount of zinc oxide should be limited to five wt. percent.

Ceramic funnels of the present invention may be easily drilled or cut before firing for the installation of electrical leads. And, the implosion strength of ceramic funnels of this invention is high.

Accordingly, it is an object of this invention to eliminate the need for metal X-ray shielding of certain electronic devices, including CRTs that operate at voltages greater than 24 kV, by the use of an X-ray attenuating ceramic material.

Related objects are to provide an X-ray attenuating ceramic material which can be manufactured into bodies for electronic components and to provide such a ceramic material which can be manufactured from readily available ingredients.

A further object is to provide such an X-ray attenuating ceramic material which can be made into thin-walled bodies which are substantially vacuum tight.

Yet another object is to provide such a ceramic material which has a coefficient of thermal expansion similar to that of standard X-ray attenuation glass compositions so that components, such as cathode ray tubes, can be manufactured using a combination of ceramic and glass parts.

An additional object is to provide such a ceramic material which can be manufactured into bodies using simple tooling and at a low firing temperature, so that it is economical to make X-ray attenuating electrical components in small quantities, as well as in larger volumes.

It is also an object to provide such a ceramic material which has a high degree of electrical resistivity and which can easily be cut or drilled for the insertion of electrically conductive leads.

Still another object is to provide a ceramic batch formulation which can be pressed into a body that holds its shape and undergoes a minimum of shrinkage during firing.

A specific object is to manufacture funnels for cathode ray tubes from such a formulation.

These and other objects, features and advantages of the present invention will be apparent from the following description.

BRIEF DESCRIPTION OF THE DRAWING

In the drawing:

FIG. 1 is a graph showing linear X-radiation, linear absorption coefficients as a function of energy, and several ceramic and glass materials.

DETAILED DESCRIPTION

The present invention concerns a polycrystalline ceramic material which has the ability to attenuate X-radiation. The material has superior physical and forming characteristics so that it may be used in the manufacture of electrical components, particularly funnels of cathode ray vacuum tubes, which require considerable physical strength and must be shaped and sized with accuracy.

CERAMIC MATERIAL

Ceramic materials according to this invention includes at least 20 percent $CeO_2$ such that the ceramic materials have the property of absorbing X-rays. For best attenuation, the ceramic materials contain at least 45 wt. per cent of X-ray attenuating oxides. However, materials with less than 45 wt. percent of X-ray attenuating oxides can be made.

To complete the minimum 45 wt. percent requirements, the ceramic material can include additional substances to attenuate X-rays at certain desired wavelengths. These include barium, strontium, yttrium, zirconium, niobium, molybdenum, neodymium and tungsten. Oxides of these substances are effective for X-ray attenuation when present in combination with $CeO_2$ listed above. For optimum results, the ceramic material should include at least 20 percent, by weight on the oxide basis of the additional X-ray attenuating elements. From a practical standpoint, the most preferred of the high-energy X-ray attenuating polycrystalline ceramics will include at least twenty wt. percent BaO, SrO, $ZrO_2$, or mixture thereof.

The total amount of all X-ray attenuating substances present cannot exceed about 70 wt, percent of the ceramic material without causing serious degradation of physical properties or increasing the firing temperature.

For components such as CRT funnels, the polycrystalline ceramic materials should have, in addition to the X-ray attenuating oxides, the following constituents:
10–25 wt. percent MgO,
1–10 wt. percent $Al_2O_2$, and
15–40 wt. percent $SiO_2$.

The ratio of MgO to $Al_2O_3$ can be adjusted to obtain a ceramic material with the best physical properties. In particular, the thermal coefficient of expansion of a polycrystalline ceramic can be adjusted by alerting this ratio.

Thus, the most significant materials, according to this invention will include the following materials in the percentages stated, by weight on the oxide basis:
10–25 percent MgO;
1–10 percent $Al_2O_3$;
15–40 percent $SiO_2$;
0–5 percent ZnO;
0–2 percent CaO;
0–2 percent $Na_2O$;
0–2 percent $K_2O$;
20–31 percent $CeO_2$;
0–6 percent BaO;
0—percent SrO;
0–±percent $ZrO_2$;
0–14 percent $Y_2O_3$;
0–14 percent $Nb_2O_3$;
0–14 percent $Rb_2O$;
0–14 percent $WO_3$; and
0–14 percent $MoO_3$, with the material containing at least 20 percent $ZrO_2$ or at least 20 percent of a mixture including some combination of BaO, SrO, $ZrO_2$, $Y_2O_3$, $Nb_2O_3$, $Rb_2O$, $WO_3$ and $MoO_3$.

The firing temperatures of polycrystalline ceramic materials will vary depending on the ratio of the compounds inclued. To conserve energy and ease manufacturing it is desirable to use a ceramic material that fires at a low temperature, preferably from 1200° to 1250° C. With few exceptions, ceramic materials defined by the immediately preceding formula will fire at a desirably low temperature of 1300° C. or less.

Most X-ray attenuating substances raise the firing temperature when included in a ceramic-making batch. It is a particular advantage of the present invention that the use of $CeO_2$, with or without $ZrO_2$, does not greatly increase the firing temperature or cause slumping of ceramic. If, however, there is an excessive increase, the firing temperature can be reduced to an acceptable level by including a fluxing agent. Typically, about 5 wt. percent or more of a fluxing agent is needed. It is particularly advantageous to include up to 15 wt. percent strontium zirconate as needed to serve as a fluxing agent. This is because $SrZrO_2$ not only reduces the firing temperature, but also improves X-ray attenuation of a ceramic material. Ba frit and ZnO are less favored, but useful, alternatives.

To be effective, a fluxing agent must be present in an amount sufficient to lower the firing temperature of the entire mixture In most instances, a reasonably low firing temperature is achieved if the ceramic material includes at least one wt. percent of the fluxing agent. For ceramic materials according to the present invention, a reasonably low firing temperature is consistently obtained when between 3 and 5 percent fluxing agent is present.

Limited amounts of alkali metal oxides can be present in X-ray attenuating ceramic compositions. Certain of these have beneficial fluxing properties; but the use of such substances should be minimized and carefully regulated. Specifically, the combined amount of $Na_2O$, $K_2O$ and $Li_2O$ should be less than three wt. percent of the material. The best results are achieved when less than 1.0 percent of $Na_2O$ and less than 0.5 percent of $Li_2$ are present. And, the amount of $Na_2O$ should not exceed the amount of $K_2O$. Outside these ranges, there is a marked deterioration in the physical and electrical properties of the ceramic; and the manufacturing process tends to be more difficult.

Lead oxide (PbO) is a fluxing agent which is known to have substantial X-ray attenuating ability. But, if PbO is added to a ceramic-making batch, the firing temperature is so greatly reduced that the body slumps during firing. The escape of gasious PbO during firing causes excessive shrinking of the ware and is environmentally hazardous. Thus, it is best to omit lead compounds from batches for making polycrystalline ceramic materials according to the present invention. In no event should lead be present in such an amount that lead oxide exceeds five wt. percent of the fired ceramic.

ELECTRONIC COMPONENTS

A variety of electronic components can be manufactured using one of the above-described ceramic aterials. For example, it is advantageous to use X-ray attenuating substances in the manufacture of certain cathode ray tubes. Such tubes might include a glass faceplate sealed to the mouth of a ceramic funnel with a fluorescent screen on the inner surface of the faceplate and an electron gun within the sealed tube.

Regardless of its X-ray attenuating ability, it is important that the ceramic material used in a cathode ray tube funnel be compatible with the faceplate glass and other components of the tube. Of particular importance, the thermal coefficient of expansion must be similar for the glass faceplate and the ceramic funnel. Due to the great capital investment required, faceplate glass is mass produced and only certain specific types are available. To manuacture small quantities of a special purpose cathode ray tubes, it is thus necessary to use a funnel made of a polycrystalline ceramic material having the same thermal coefficient of expansion as an available faceplate glass. A desired coefficient can usually be obtained by formulating the ceramic material to include MgO and $Al_2O_3$ at a proper ratio.

Compatibility with available faceplate glasses is achieved most readily using a ceramic material that includes from 10 to 25 wt. percent MgO and 1 to 10 percent $Al_2O_3$. The relative amount of magnesium and aluminum oxides can be adjusted within such ranges to manufacture X-ray attenuating ceramic materials suitable for use with standard faceplate glass materials having a coefficient of thermal expansion of $88-100 \times 10^{-7}$ in./in. per °C (50°–500° C.).

PROCEDURE

An advantage of the ceramic materials of the present invention is that they can be used to form ceramic bodies by substantially conventional techniques. The batch ingredients are combined with water in a ballmill and milled for a period of about 7.5 hours. The resulting slurry is spray-dried to provide a powder of spherical particles, preferably from 1 to 44 microns in diameter. To form a funnel-shaped body for a cathode ray tube, the powder is placed between a mandrel and an outer polyurethane boot and compressed at about 12,000 psi in a isostatic press.

The formed funnels are then fired in a kiln to a dense ceramic. Some shrinkage of the bodies occurs during firing. But the extent of shrinkage is controlled by using an appropriate pressure during formation of the body and by selecting the batch ingredients so that the loss on ignition is within a desired low range.

cal properties. For example, if additional talc or magnesia is used, greenware bodies will be subject to slumping.

EXAMPLES

Batches suitable for forming polycrystalline ceramic cathode ray tube funnels are specified in Table I. Examples 2-18 show numerous batches successfully used to manufacture polycrystalline ceramic bodies according to the present invention. Also included, for comparison purposes, is Example 1, which illustrates a batch for a commercially produced X-ray attenuating forsterite material.

TABLE I

| | BATCH FORMULATION (wt. %) | | | | | | | | |
|---|---|---|---|---|---|---|---|---|---|
| EXAMPLE NO.: | 1 | 2 | 3 | 4 | 5 | 6 | 7 | 8 | 9 |
| TALC (yellowstone) | 9.70 | 8.66 | 8.00 | 7.33 | 6.67 | 6.67 | 8.00 | 10.00 | 9.00 |
| TALC (Pfizer Circron MP9825) | 9.70 | 8.67 | 8.00 | 7.33 | 6.67 | 6.67 | 8.00 | 10.00 | 9.00 |
| TALC (Pfizer Talcron MP4526) | 9.70 | 8.67 | 8.00 | 7.34 | 6.66 | 6.66 | 9.00 | 11.00 | 8.00 |
| MAGNESIA | 21.01 | 13.00 | 12.00 | 11.00 | 10.00 | 10.00 | 12.00 | 6.00 | 13.00 |
| FELDSPAR (Kingman KSPAR) | 14.14 | 11.00 | 14.00 | 17.00 | 20.00 | 16.00 | 11.00 | 11.00 | 6.00 |
| ZIRCONIA | | 25.00 | 25.00 | 25.00 | 25.00 | 27.00 | 20.00 | 20.00 | 25.00 |
| CERIA (Rhone-Poulenc) | | 25.00 | 25.00 | 25.00 | 25.00 | 27.00 | 25.00 | 25.00 | 25.00 |
| $SrZrO_3$ (Transelco 118) | 14.14 | | | | | | 5.00 | 5.00 | |
| ZINC OXIDE | 3.54 | | | | | | | | |
| ALUMINA | 2.42 | | | | | | | | |
| CHROMIUM OXIDE | 1.01 | | | | | | | | |
| TALC (Pfizer Circron MP9954) | 14.65 | | | | | | | | |
| Ba FRIT (Ferro 3249) | | | | | | | | | 5.00 |
| CALCIUM CARBONATE | | | | | | | 2.00 | 2.00 | |

| EXAMPLE NO.: | 10 | 11 | 12 | 13 | 14 | 15 | 16 | 17 | 18 |
|---|---|---|---|---|---|---|---|---|---|
| TALC (yellowstone) | 9.00 | 9.00 | 7.00 | 4.00 | 8.00 | 8.00 | 8.00 | 10.00 | |
| TALC (Pfizer Circron MP9825) | 9.00 | 9.00 | 7.00 | 4.00 | 8.00 | 8.00 | 8.00 | 10.00 | 24.00 |
| TALC (Pfizer Talcron MP4526) | 8.00 | 8.00 | 8.00 | 5.00 | 8.00 | 8.00 | 8.00 | 11.00 | |
| MAGNESIA | 13.00 | 10.00 | 10.00 | 6.50 | 12.00 | 12.00 | 12.00 | 8.00 | 12.00 |
| FELDSPAR (Kingman KSPAR) | 11.00 | 14.00 | 14.00 | 14.00 | | 7.00 | 9.00 | 11.00 | 9.00 |
| ZIRCONIA | 20.00 | 25.00 | 27.00 | 31.00 | 25.00 | 25.00 | 25.00 | 20.00 | |
| CERIA (Rhone-Poulenc) | 25.00 | 25.00 | 27.00 | 31.00 | 25.00 | 25.00 | 25.00 | 25.00 | 25.00 |
| $SrZrO_3$ (Transelco 118) | 5.00 | | | 4.50 | | | | 5.00 | |
| Ba FRIT (Ferro 3249) | | | | | 14.00 | 7.00 | 5.00 | | 5.00 |
| *ZIRCONIA STAB | | | | | | | | | 25.00 |

*Zirconia stabilized with 5% CaO.

BATCH FORMULATIONS

Ceramic-making batches according to the present invention include raw materials that are naturally occurring substances, such as talc and feldspar. A variety of different talcs and feldspars could be used in the batches that require such materials. If the overall ratio of talc and feldspar was maintained, but other combinations of specific talcs and feldspars used, there would be small variations in the resulting ceramic materials. A person of ordinary skill in this art would be able to select a suitable mixture of talcs and feldspars for each of the listed batches.

A preferred batch is:
13-31 wt. percent talc;
6-13 wt. percent MgO;
9-14 wt. percent feldspar;
20-31 wt. percent $CeO_2$;
0-5 wt. percent $Al_2O_3$;
0-35 wt. percent $ZrO_2$;
0-15 wt. percent $SrZrO_3$;
0-14 wt. percent Ba frit; and
0-5 wt. percent ZnO.

Most preferably, the batch will include 20-35 wt. percent $ZrO_2$.

Batches substantially outside the above-listed ranges will produce ceramic materials of unacceptable physi- Polycrystalline ceramic funnels for cathode ray tubes were made fom the batches of Examples 1 and 13. In each example, a funnel was formed as described above. Firing took from one to two hours at a temperature within the range of 1200° to 1270° C. The specific firing temperature and time for each example was selected empirically to provide a funnel having the best physical properties. Ceramic porosity could be decreased by raising the firing temperature; but slumping problems would result if the temperature was too high. Thus, in each example the kiln temperature was set as high as possible below the temperature at which there was undue slumping of the ware. Test disks and bars were made from each of the other example compositions. These tests indicated that all of the example materials would be suitable for the manufacture of CRT funnels.

Example 1 describes a prior forsteritic ceramic material which is absorptive of X-radiation to a lesser extent than can be achieved, using polycrystalline ceramics with at least 20 wt. percent $CeO_2$.

Examples 2-18 describe polycrystalline ceramic materials according to the present invention. Cathode ray tubes having unshielded funnels made of such materials can be operated safely over a wide range of voltages.

Physical and electrical properties of the example ceramic materials are summared in Table II.

TABLE II

PROPERTIES OF FIRED BODIES (wt. %)

| EXAMPLE NO.: | 1 | 2 | 3 | 4 | 5 | 6 | 7 | 8 | 9 |
|---|---|---|---|---|---|---|---|---|---|
| DENSITY (g/cc) | 3.08 | 3.49 | 3.49 | 3.45 | 3.52 | 3.52 | 3.76 | 3.56 | 3.59 |
| SLUMP (% Ex. 1) | 100.00 | 33.00 | 38.00 | 41.00 | 46.00 | | 86.00 | 141.00 | 51.00 |
| SHRINK FAC (<1.10) | 1.16 | 1.12 | 1.12 | 1.11 | 1.11 | | 1.17 | 1.15 | 1.11 |
| DYE TIGHT? | Yes | Yes | Yes | Yes | Yes | | Yes | Yes | Marg |
| CTE | | | | | | | | | |
| (25-450C) (~9.5) | 9.48 | 9.54 | | 9.71 | | | | | |
| (25-500C) | 9.61 | 9.62 | | | | | | | |
| LAC | | | | | | | | | |
| @ 18 kV (>51.2) | 31.23 | 48.49 | 48.62 | 48.19 | 49.30 | 52.03 | 58.82 | 55.77 | 53.54 |
| @ 21 kV (>53.5) | 31.51 | 71.62 | 71.70 | 70.96 | 72.49 | 77.50 | 77.97 | 73.97 | 76.05 |
| @ 25 kV (>45.7) | 19.57 | 44.48 | 44.53 | 44.07 | 45.01 | 48.13 | 48.78 | 45.84 | 47.22 |
| @ 31 kV (>26) | 10.83 | 24.66 | 24.69 | 24.43 | 24.95 | 26.67 | 26.80 | 25.39 | 26.15 |
| LOG RESISTIVITY | | | | | | | | | |
| (ohm-cm @ RT) (>14) | | | 11.50 | | | | | | |

| EXAMPLE NO.: | 10 | 11 | 12 | 13 | 14 | 15 | 16 | 17 | 18 |
|---|---|---|---|---|---|---|---|---|---|
| DENSITY (g/cc) | 3.67 | 3.52 | 3.67 | 3.82 | 4.11 | 3.86 | 3.67 | 3.67 | 3.84 |
| SLUMP (% Ex. 1) | 65.00 | 49.00 | 45.00 | 72.00 | 99.00 | 77.00 | 45.00 | 123.00 | 92.00 |
| SHRINK FAC (<1.10) | 1.11 | 1.10 | 1.11 | 1.21 | 1.22 | 1.21 | 1.11 | | 1.18 |
| DYE TIGHT? | Yes | Yes | Yes | Yes | Yes | Yes | Yes | Yes | Yes |
| CTE | | | | | | | | | |
| (25-450C) (~9.5) | 10.21 | | | | | | 9.57 | 9.51 | 9.35 |
| (25-500C) | 10.31 | | | | | | 9.68 | 9.57 | 9.42 |
| LAC | | | | | | | | | |
| @ 18 kV (>51.2) | 56.59 | 49.06 | 54.16 | 68.49 | 69.01 | 59.29 | 55.80 | 56.66 | 57.60 |
| @ 21 kV (>53.5) | 75.23 | 72.34 | 80.75 | 103.42 | 92.10 | 82.89 | 79.16 | 75.27 | 79.28 |
| @ 25 kV (>45.7) | 46.70 | 44.92 | 50.15 | 64.29 | 57.16 | 51.46 | 49.15 | 46.72 | 49.20 |
| @ 31 kV (>26) | 25.87 | 24.90 | 27.79 | 35.60 | 31.59 | 28.48 | 27.21 | 25.88 | 27.23 |
| LOG RESISTIVITY | | | | | | | | | |
| (ohm-cm @ RT) (>14) | 14.60 | | | | 15.50 | 15.30 | 15.00 | | |

All the polycrystalline ceramic materials of Examples 1–18 are of sufficient mechanical strength that they can be used for the manufacture of electronic components such as cathode ray tube funnels. All those indicated as being "dye tight" were sufficiently nonporous that they could be used for cathode ray tube funnels. It is believed that nonporous bodies could be formed from the other batches merely by elevating the kiln temperature to slightly above 1270° C.

Funnels manufactured from any of the batches would meet industry and government standards for the attenuation of X-rays at 0.6 angstroms. But, Table II shows that the X-ray attenuating ability varies depending on the composition.

The forsteritic X-ray attenuating ceramic manuactured from the batches of Example 1 had the lowest absorption coefficients. The Example 1 material can be used for unshielded funnels, but does not have a high enough absorption coefficient to provide complete attenuation for thin-walled cathode ray tubes over a wide spectrum of voltages.

In the examples where the greatest X-ray attenuating ability is obtained, a ceramic includes at least 20 wt. percent $CeO_2$. The best attenuation was achieved with 31 wt. percent $CeO_2$ as shown by Example 13. The presence of substantial amounts of $ZrO_2$ also contributes to the attenuation in Example 13.

Certain ceramic compositions of the present invention, such as that of Example 13, can be used to form funnels which have walls of normal thickness and yet exceed the X-ray attenuating ability of the best glass funnels. Furthermore, such ceramic funnels have greater implosion strength at a given wall thickness or tube weight.

This improvement is illustrated in FIG. 1, which shows curves of linear absorption coefficients versus voltage for several X-ray attenuating ceramic materials. The curves of FIG. 1 can be used to compare the X-ray attenuating ability of the ceramic material of Example 1, which is a commercial X-ray attenuating forsteritic porcelain, and the composition of Example 13, which contains a preferred mixture of X-ray attenuating substances including cerium oxide and zirconium oxide. Also illustrated is a common CRT funnel glass, Schott KWB and a high attenuating funnel glass, Corning 0120. As shown by the drawing, the polycrystalline ceramic of Example 13 has the best attenuation across a wide range of energy levels.

The X-ray linear absorption coefficient of a ceramic material is affected by the acceleration voltage at which a cathode ray tube is operated because electrons accelerated at higher voltage differentials produce X-radiation of a relatively short wavelength. Short wavelength X-radiation is generally more penetrating of a ceramic material than is longer wavelength X-radiation, as illustrated in the curves of FIG. 1. In these graphs, linear absorption coefficients are plotted against acceleration voltage in kilovolts for various materials. The acceleration voltage corresponds with X-radiation wavelength.

The importance of this invention, that $CeO_2$ polycrystalline ceramic compositions can have X-ray attenuating ability which exceeds that of X-ray attenuating glasses, is shown by the curves which appear in FIG. 1.

Because such ceramic materials can be formed into X-ray attenuating funnels, it is now possible to manufacture special purpose cathode ray tubes in short production runs, and at a relatively low cost. Using the most preferred formultions, the X-ray attenuating ability of such ceramic funnels is greater than that of X-ray attenuating glass components. And cathode ray tubes that incorporate the ceramic funnels will typically have a greater implosion strength than equivalent components manufactured from glass.

While we have shown and described preferred embodiments of our invention, it will be apparent to those skilled in the art, that changes and modifications may by made without departing from the invention in its broader aspects. For example, the foregoing discussion primarily concerns the use of specific polycrystalline ceramics for the manufacture of cathode ray tube funnels. But, ceramic materials according to this invention are useful in the manufacture of various electrical components other than the components of cathode ray tube bodies. It is therefore intended that the appended claims cover all such changes and modifications as fall within the true scope and spirit of our invention.

We claim:

1. In a cathode ray tube comprising a polycrystalline ceramic funnel, a glass faceplate sealed to the funnel and an electron gun disposed within the sealed tube, the improvement wherein the funnel is a rigid, nonporous body of polycrystalline ceramic material formed by shaping a uniformly dispersed mixture of oxides to from a greenware body and heating the greenware body to a temperature which is sufficient to cause sintering of the mixture without total melting and loss of shape, the material having, by weight on the oxide basis, a total of at least 45 percent x-ray attenuating materials including, at least 20 percent $CeO_2$ and at least 20 percent of a material selected from the group consisting of BaO, SrO, $ZrO_2$, $Y_2O_3$, $Nb_2O_3$, and mixtures thereof, the ceramic material having the property of absorbing X-ray wavelengths of X-rays which result from operation of the gun.

2. The improvement of claim 1 wherein the ceramic material is a ceramic material which comprises, by weight on the oxide basis:
   10-25 percent MgO;
   1-10 percent $Al_2O_3$;
   15-40 percent $SiO_2$;
   20-31 percent $CeO_2$; and
   at least 20 percent of an x-ray attenuating substance selected from the group consisting of BaO, SrO, $ZrO_2$, $Y_2O_3$, $Nb_2O_3$, and mixtures thereof.

3. The improvement of claim 1 wherein the ceramic material consists essentially of, by weight on the oxide basis:
   10-25 percent MgO;
   1-10 percent $Al_2O_3$;
   15-40 percent $SiO_2$;
   20-31 percent $CeO_2$;
   0-5 percent ZnO;
   0-2 percent CaO;
   0-2 percent $Na_2O$;
   0-2 percent $K_2O$;
   0-15 percent SrO;
   0-6 percent BaO; and
   0-35 percent $ZrO_2$;
   at least 20 percent of the ceramic material being of the group consisting of BaO, SrO, $ZrO_2$ and mixtures thereof.

4. The improvement of claim 1 wherein the ceramic material includes MgO and $Al_2O_3$ at such a ratio that the material has a thermal coefficient of expansion similar to that of the glass faceplate.

5. The improvement of claim 1 wherein the ceramic material includes a sufficient amount of SrO, ZnO, or a mixture thereof that the material is vitrifiable, to the extent that the material is vacuum tight, at a firing temperature not greater than 1300° C.

6. The improvement of claim 5 wherein the ceramic material includes a sufficient amount of SrO that the material is vitrifiable, to the extent that the material is vacuum tight, at a firing temperature not greater than 1300° C.

7. In a cathode ray tube comprising a polycrystalline ceramic funnel, a glass faceplate sealed to the funnel and an electron gun disposed within the sealed tube, the improvement wherein:
   the funnel is a rigid, nonporous body of ceramic material formed by shaping a uniformly dispersed mixture of oxides to form a greenware body and heating the greenware body to a temperature which is sufficient to cause sintering of the mixture without total melting and loss of shape, the mixture comprising, by weight
   13-31 percent talc,
   6-13 percent MgO,
   9-14 percent feldspar,
   20-31 percent $CeO_2$,
   0-5 percent $Al_2O_3$,
   0-35 percent $ZrO_2$,
   0-29 percent $SrZrO_3$,
   0-14 percent Ba frit, and
   0-5 percent ZnO; and the material has, by weight on the oxide basis
   10-25 percent MgO,
   1-10 percent $Al_2O_3$,
   15-40 percent $SiO_2$,
   20-31 percent $CeO_2$,
   0-5 percent ZnO,
   0-2 percent CaO,
   0-2 percent $Na_2O$,
   0-2 percent $K_2O$,
   0-15 percent SrO,
   0-6 percent BaO, and
   0-35 percent $ZrO_2$,
   at least 20 percent of the material being of the group consisting of BaO, SrO, $ZrO_2$ and mixtures thereof, so that the ceramic material has the property of absorbing x-ray of wavelengths of x-rays which result from operation of the gun.

8. In a process for the manufacture of a polycrystalline cathode ray tube comprising a ceramic funnel, a glass faceplate sealed to the funnel and an electron gun disposed within the sealed tube, the improvement wherein the funnel is made by:
   providing a homogenous mixture of constituents, the mixture providing not more than 5 wt. percent PbO, and providing at least 20 wt. percent $CeO_2$, the amount of the $CeO_2$ being sufficient to impart to the body the property of absorbing X-ray wavelengths which result from operation of the gun;
   shaping the mixture to form a greenware body; and
   heating the greenware body to a temperature sufficient to cause sintering of the mixture without total melting and loss of shape.

9. The improvement of claim 8 wherein the mixture comprises, by weight:
   13-31 percent talc;
   6-13 percent MgO;
   9-14 percent feldspar;
   20-31 percent $CeO_2$;
   0-5 percent $Al_2O_3$;
   0-35 percent $ZrO_2$;
   0-15 percent $SrZrO_3$;

0-14 percent Ba frit; and
0-5 percent ZnO.
10. The improvement of claim 8 wherein the mixture comprises, by weight:
20-35 percent $ZrO_2$.
11. The improvement of claim 8 wherein the mixture has materials to provide in the ceramic at least 20 wt. percent of a substance selected from the group consisting of oxides of barium, strontium, zirconium, and mixtures of such oxides.

* * * * *